United States Patent
Cunningham et al.

(10) Patent No.: US 11,681,642 B2
(45) Date of Patent: Jun. 20, 2023

(54) PROCESSING DEVICE COMPRISING CONTROL BUS

(71) Applicant: Graphcore Limited, Bristol (GB)

(72) Inventors: Graham Bernard Cunningham, Chippenham (GB); Daniel John Pelham Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/328,143

(22) Filed: May 24, 2021

(65) Prior Publication Data

US 2021/0397572 A1    Dec. 23, 2021

(30) Foreign Application Priority Data

Jun. 17, 2020 (GB) ..................................... 2009264

(51) Int. Cl.
  *G06F 13/374* (2006.01)
  *G06F 13/364* (2006.01)
  *G06F 15/173* (2006.01)

(52) U.S. Cl.
  CPC .......... *G06F 13/374* (2013.01); *G06F 13/364* (2013.01); *G06F 15/17375* (2013.01)

(58) Field of Classification Search
  CPC . G06F 13/364; G06F 13/374; G06F 15/17375
  USPC ....................................................... 710/107
  See application file for complete search history.

(56) References Cited

U.S. PATENT DOCUMENTS

| 6,718,421 | B1  | 4/2004  | Conroy |
| 7,389,459 | B2* | 6/2008  | Blasco Allue ......... G11C 29/16  365/201 |
| 8,301,817 | B1  | 10/2012 | Grijalva |
| 9,152,595 | B2* | 10/2015 | Ganasan ............. G06F 13/4004 |
| 9,213,660 | B2* | 12/2015 | Salisbury ............. G06F 13/362 |

(Continued)

FOREIGN PATENT DOCUMENTS

| JP | 2010198625 A  | 9/2010 |
| WO | 2017033421 A1 | 3/2017 |
| WO | 2018104711 A1 | 6/2018 |

OTHER PUBLICATIONS

Combined Search and Examination Report dated Oct. 30, 2020 for United Kingdom Patent Application No. GB2009264.9. 8 pages.

(Continued)

*Primary Examiner* — Brian T Misiura
(74) *Attorney, Agent, or Firm* — Haynes and Boone, LLP

(57) ABSTRACT

A device comprising: a control bus; a plurality of requesting circuits each accessible on the control bus, wherein each of the plurality of requesting circuits is operable to dispatch read or write requests to the control bus for delivery to at least one of a plurality of receiving circuits, and the plurality of receiving circuits each accessible on the control bus, and each of which is operable to receive requests from the at least one control bus and service the requests by providing at least one of read or write access to storage associated with the respective receiving circuit, wherein the control bus provides a ring path configured to support, the requests in circulation in the ring path, wherein the control bus is configured to propagate each of at least some of the requests at least until those requests have been serviced by at least one of the receiving circuits.

32 Claims, 8 Drawing Sheets

(56) References Cited

U.S. PATENT DOCUMENTS

| | | | |
|---|---|---|---|
| 10,180,919 B1 | 1/2019 | Johnson | |
| 10,185,671 B1 | 1/2019 | Khan | |
| 2013/0268930 A1* | 10/2013 | Saidi | G06F 12/0833 718/1 |
| 2014/0282819 A1 | 9/2014 | Sastry Manoj | |
| 2015/0006776 A1* | 1/2015 | Liu | G06F 15/17381 710/113 |
| 2015/0310229 A1 | 10/2015 | Rohleder et al. | |
| 2016/0350549 A1 | 12/2016 | Hampel et al. | |
| 2019/0012102 A1 | 1/2019 | Kawahara | |
| 2021/0342284 A1* | 11/2021 | Knowles | H04L 45/16 |
| 2021/0397754 A1* | 12/2021 | Wilkinson | G06F 21/604 |

OTHER PUBLICATIONS

Combined Search and Examination Report dated Mar. 5, 2021 for United Kingdom Patent Application No. GB2009265.6. 8 pages.
Miltos D Grammatikakis, et al., Security in MPSoCS: A NoC Firewall and an Evaluation Framework:, IEEE Transactions on Computer Aided Design of Integrated Circuits and Systems, vol. 34, No. 8, Aug. 1, 2015. pp. 1344-1357.

* cited by examiner

| Initiator | Level 1 Access Permissions | Level 2 Access Permissions | Access Permitted? |
|---|---|---|---|
| 1 | 0b | 0b | Yes |
| 2 | 0b | 1b | No |
| 3 | 1b | 0b | No |
| 4 | 1b | 1b | No |

| Initiator | Access Permissions | Written to by first management unit? | Can be modified by second management unit? | Access Permitted? |
|---|---|---|---|---|
| 1 | 0b | No | Yes | Yes |
| 2 | 0b | Yes | Yes | Yes |
| 3 | 1b | No | Yes | No |
| 4 | 1b | Yes | No | No |

| Initiator | Level 1 Access Permissions | Written to by first management unit? | Level 2 Access Permissions | Written to by first management unit? | Access Permitted? |
|---|---|---|---|---|---|
| 1 | 0b | No | 0b | No | Yes |
| 2 | 0b | Yes | 1b | Yes | No |
| 3 | 1b | No | 0b | Yes | No |
| 4 | 1b | Yes | 1b | No | No |

PROCESSING DEVICE COMPRISING CONTROL BUS

CROSS-REFERENCE TO RELATED APPLICATIONS

The present application claims priority to United Kingdom Patent Application No. 2009264.9, filed on Jun. 17, 2020, the disclosure of which is hereby incorporated herein by reference in its entirety.

TECHNICAL FIELD

The present disclosure relates to a processing device, and in particular to a processing device having a control bus that provides a ring path for providing read and/or write requests between requesting and receiving circuits.

BACKGROUND

A processing device, such as a system on chip, comprises a plurality of different units having different functions. The processing device may, for example, include a plurality of different processing elements that are configured to execute computer readable instructions to perform operations on data stored in memory. In addition to these processing elements, the processing device may comprise additional elements—e.g. reset registers, exchange circuits, etc—that enable the processing device to operate. Many of the different elements of the processing device may be accessed by other elements of the processing device via interconnects that exchange control information between the different elements of the processing device.

When designing an processing device in which different elements of the processing device can read or write to storage associated with other elements of the processing device, it is important to consider how to requests can be provided between the elements of the processing device. Particularly, in larger processing devices having more components, providing a suitable exchange or interconnect for passing data between components is a technical challenge.

SUMMARY

One problem with conventional buses for use in processing devices is that they typically do not scale well for use in larger processing devices. For example, one type of conventional bus uses a tree structure in which data packets are routed between different on chip components using routing hardware. However, in larger chips with more components, such routing can lead to an undesirably high latency being associated with on chip communication between components.

According to a first aspect, there is provided a device comprising: a control bus; a plurality of requesting circuits each accessible on the control bus; and a plurality of receiving circuits each accessible on the control bus, each of the receiving circuits being associated with a storage, wherein each of the plurality of requesting circuits is operable to dispatch at least one of read or write requests to the control bus for delivery to at least one of the plurality of receiving circuits, each of the read or write requests being a request to read or write from the storage associated with one or more of the receiving circuits to which it is dispatched, is wherein each of the receiving circuits is operable to receive one or more of the read or write requests from the at least one control bus and service the one or more of the requests by providing at least one of read or write access to the storage associated with the respective receiving circuit, wherein the control bus provides a ring path configured to support the at least one of read or write requests in circulation in the ring path, wherein the control bus is configured to propagate each of the requests at least until those requests have been serviced by one of the receiving circuits.

By having a control bus providing a ring path configured to propagate the at least one of read or write requests at least until they are serviced by a receiving circuit, a large number of requesting and receiving circuits can be supported without the high latency associated with using certain control bus schemes to route read or write requests between a large number of on-chip elements.

In some embodiments, each of at least some of the read or write requests comprises an identifier of one of the requesting circuits, wherein each of the identified receiving circuits is configured to service one or more of the at least some of the read or write requests in response to an interface associated with the receiving circuit determining that the respective one or more of the at least some of the read or write requests comprises an identifier of the respective receiving circuit.

In some embodiments, the servicing the one or more requests comprises each of at least some of the receiving circuits dispatching one or more completion packets onto the control bus for delivery to the one or more requesting circuits that sent the respective one or more requests.

In some embodiments, the control bus is configured to transport one or more completion token packets, wherein each of the plurality of receiving circuits is operable to: perform the dispatching of each of the one or more completion packets in response to receipt of one of the completion token packets; and for each of the dispatched completion packets, consume the received completion token packet that triggered the dispatching.

In some embodiments, the device comprises a regulator circuit configured to control the number of completion tokens circulating on the control bus by issuing completion tokens onto the control bus.

In some embodiments, at least one of the one or more requests is a read request, wherein the servicing of the at least one read request comprises dispatching at least one read completion packet onto the control bus for delivery to the at least one requesting circuit that sent the respective at least one read request, wherein each of the at least one read completion packets comprises a payload comprising data read from the storage associated with at least one of the receiving circuits that serviced the corresponding read request.

In some embodiments, the control bus is configured to transport one or more request token packets, wherein each of the plurality of requesting circuits is operable to: perform the dispatching of each of the at least one of read or write requests in response to receipt of one of the request token packets; and for each of the dispatched read or write requests, consume the received request token packet that triggered the dispatching.

In some embodiments, for at least one of the receiving circuits, the servicing the one or more of the requests comprise: consuming the one or more of the requests; and dispatching a request token onto the control bus.

In some embodiments, for at least one of the receiving circuits, the servicing the one or more of the requests comprises leaving the one or more of the requests to circulate on the control bus, wherein each of the at least one of the requesting circuits that dispatched the one or more of the requests left to circulate on the control bus is configured to, for each of the one or more requests that it dispatched: consume the respective request; and dispatch a request token onto the control bus.

In some embodiments, the device comprises a regulator circuit configured to control the number of request tokens circulating on the control bus by issuing request tokens onto the control bus.

In some embodiments, at least one of the read or write requests is a broadcast request for delivery to all of the receiving circuits on the control bus, wherein the receiving and servicing the one or more of the requests by the plurality of receiving circuits comprises each of the plurality of receiving circuits receiving and servicing the at least one broadcast request.

In some embodiments, each of the storages associated with one of the plurality of receiving circuits is part of a component of the device that comprises the associated one of the plurality of receiving circuits.

In some embodiments, each of the components comprises one or more of: a management central processing unit; a plurality of processors; and a dispatcher for access to a host processing system.

In some embodiments, each of at least some of the plurality of receiving circuits comprises at least one register storing at least one access permission, wherein, for each of these at least some of the plurality of receiving circuits storing at least one access permission, the servicing the one or more of the requests is performed in response to determining from the respective at least one access permission that access to the associated storage of the respective receiving circuit is permitted.

In some embodiments, each of the least one access permissions comprises a set of access permissions comprising a setting associated with each of at least some of the requesting circuits, wherein for each of these at least some of the plurality of receiving circuits storing a set of access permissions, the servicing the one or more of the requests is performed in response to determining from the respective set of access permissions that access to the associated storage of the respective receiving circuit is permitted for the requesting circuit that dispatched the respective read or write request.

In some embodiments, the device is an integrated circuit.

According to a second aspect, there is provided a method implemented in a device having a control bus wherein the control bus provides a ring path configured to support the at least one of read or write requests in circulation in the ring path, the method comprising: dispatching via each of a plurality of requesting circuits, at least one of read or write requests to the control bus for delivery to at least one of a plurality of receiving circuits, each of the read or write requests being a request to read or write from storage associated with at least one of the receiving circuits; circulating each of at least some of the requests at least until those requests have been serviced by at least one of the receiving circuits; receiving via each of the plurality of receiving circuits, one or more of the read or write requests from the at least one control bus; and servicing at each of the plurality of receiving circuits, the one or more of the requests by providing at least one of read or write access to the storage associated with the respective receiving circuit.

BRIEF DESCRIPTION OF DRAWINGS

For a better understanding of the present invention and to show how the same may be carried into effect, reference will now be made by way of example to the accompanying Figures in which:

FIG. 4 illustrates an example of a set of access permissions comprising two levels defined with on a target-initiator basis;

FIG. 5 illustrates an example of a plurality of sets of access permissions, with a flag indicating whether the level 1 manager has written to the access permissions;

FIG. 6 illustrates a further example of a plurality of sets of access permissions, with a flag indicating whether the level 1 manager has written to the access permissions;

DETAILED DESCRIPTION

The techniques described herein can be implemented in a processing unit. An example processing unit in which the techniques may be implemented is the Intelligence Processing Unit (IPU) described in our earlier U.S. application Ser. No. 15/885,925, the contents of which are incorporated by reference. However, the techniques described herein may also be applied to other types of device.

Figure 1:
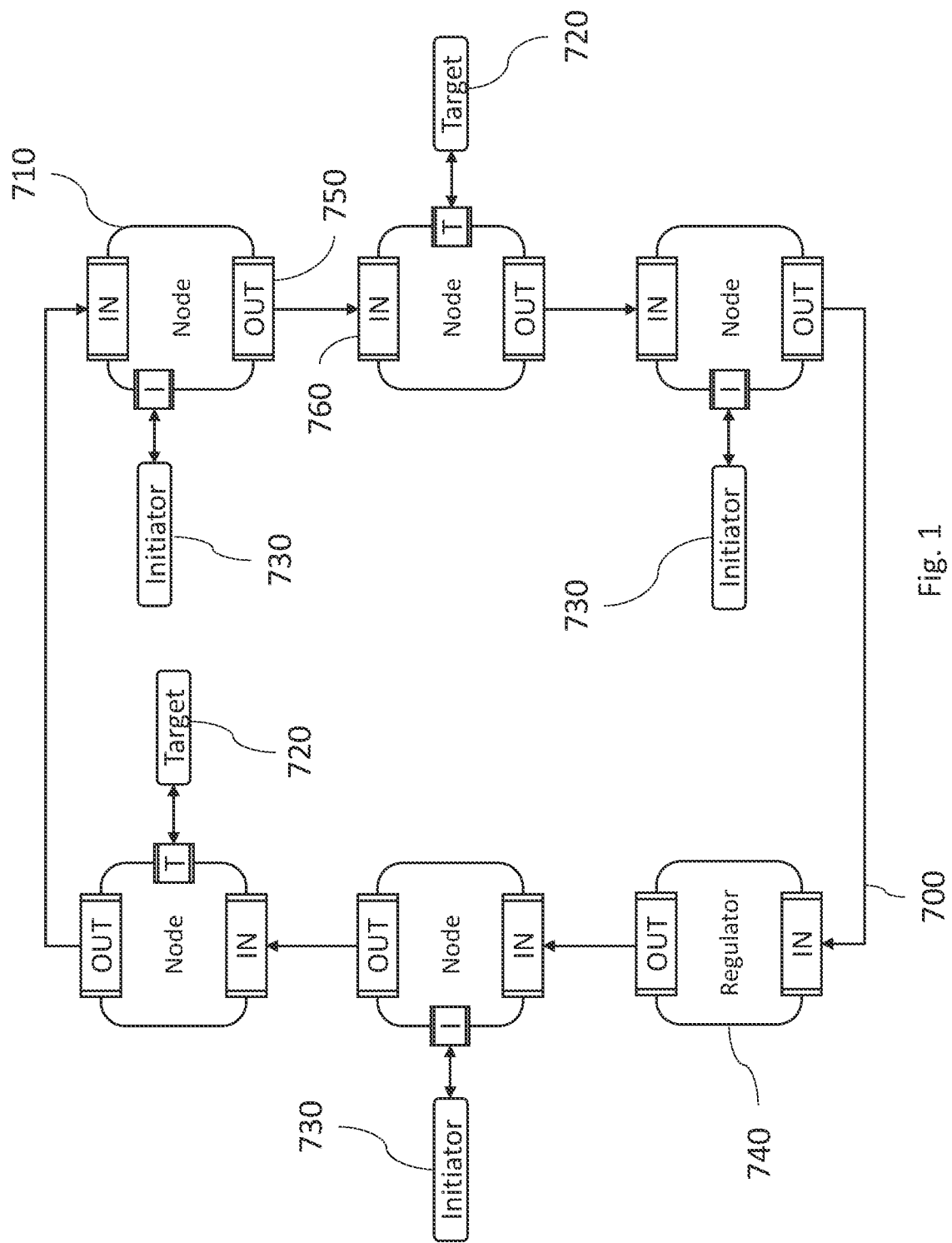
FIG. 1 illustrates a control bus for exchange of packets between initiators and targets.

A control bus for carrying control traffic is implemented in an integrated circuit (i.e. a chip). Reference is made to FIG. 1, which illustrates an example of the control bus 700. The control bus 700 is a datapath for carrying single word control traffic in ring. The control bus 700 is a pipelined data bus via which data packets move from stage to stage in the pipeline at a rate determined by a clock pulse that is applied to the control bus 700. The ring comprises a plurality of a nodes 710, with traffic passing from one node 710 to the next node 710 in a direction of flow around the ring. Each node's output port 750 is connected to the input port 760 of the next node 710 in the ring.

Some of the nodes 710 comprise connections to a receiving circuit 720 (referred to herein as a bus target 720) for receiving read or write requests to a storage associated with the bus target 720. Some of the nodes also include connections to a requesting circuit 730 (referred to herein as bus initiators 730) which issue the read or write requests. In embodiments, the control bus 700 carries traffic between up to 16 bus initiators and 512 bus targets. A node 710 is, therefore, a block in the control bus 700 that connects a bus initiator 730 or bus target 720 to the control bus 700.

Examples of on chip components/devices incorporating bus initiators 730 include: an on-chip processor running software or firmware, an I/O port (e.g. a PCI express endpoint which receives requests from software running on an external processor connected to the IPU by PCIe), a hardware unit that uses the control bus to communicate with another hardware unit on the chip. Each of these components are able to issue read or write requests via their requesting circuit/bus initiator 730. All of the bus initiators 730 are on the chip. Each of the components incorporating a bus initiator 730 also incorporates a requesting block that issues read or write requests via the bus initiator 730.

Examples of on chip components/devices that include a bus target 720 include: a hardware unit having control registers storing parameters controlling the operation of the hardware unit, an on-chip storage (e.g. SRAM or non-volatile memory), a bridge to off chip storage (such as a DRAM memory controller), circuitry for converting packets from the control bus communication protocol described to another protocol. Each of such bus targets 720 is associated with a storage that may be read to or written from. All of the bus targets 720 are on chip. Each of the components incorporating a bus target 720 also includes a receiving block, which contains the storage that may be written to or read from in response to requests received at the bus target 720.

Each of the bus initiators 730 is capable of issuing requests to bus targets 720 and receiving completions from the bus targets 720. Each request is either a command to read from a storage (e.g. an attached addressable entity or auto-generated register) associated with the bus target 720 or a request to write to such a storage associated with the bus target 720. In response to receipt of such a request, a bus target 720 responds by issuing a completion. A completion provides a status updates indicating whether or not the read or write request was successful or not.

Control bus nodes 710 connect bus initiators 730 and bus targets 720 to the control bus 700. The control bus nodes 710 handle control bus 700 transaction routing, and manage the control bus 700 access protocol. Each control bus node 710 may have either a bus initiator interface or a bus target interface.

The bus initiators 730 issue requests onto the control bus 710 and receive the relevant completions in response. Once bus access is granted to a bus initiator 730 by its connected Node 710, the bus initiator 730 can issue its request transaction onto control bus 700 via its node 710. A bus initiator 730 also receives completions from bus targets 720 in response to the read or write requests that it has issued.

Also issued in the ring are request and completion tokens. These are packets that circulate around the ring and allow the bus initiators 730 and bus targets 720 to arbitrate for access to the control bus 700. The number of tokens in circulation around the ring is controlled by the regulator 740. The regulator 740 issues the tokens initially and, as will be understood, tokens are added and removed by the bus initiators 730 and bus targets 720 when they send and receive requests and completions. The tokens are used to grant access to the control bus 700 for the bus initiators 730 and the bus targets 720. The control bus regulator 740 is responsible for controlling control bus 710 access by issuing request and completion tokens onto the bus 710. The number of request and completion tokens (which is set by the regulator 740) circulating on the control bus 700 determines how many outstanding transactions the control bus 700 supports.

The tokens take the form of request tokens and completion tokens. The request tokens grant access to the control bus 700 for the bus initiators 730. The completion tokens grant access to the control bus 700 for the bus targets 720. The request tokens circulate along the control bus 700, until a bus initiator 730 that has a pending request to issue receives the token and removes it from the control bus 700. Each request token includes an identifier (referred to as an initid). The identifier, initid, identifies either the regulator 740 or one of the bus initiators 730 in the ring. When a request token arrives at a node 710, a bus initiator 730 of that node 710 will remove the request token from the ring in response to determining that either the identifier in the request token matches an identifier for that bus initiator 730 or the identifier in the request token matches an identifier of the regulator 740. Therefore, the request token circulates the control bus 700 and is removed either, when it arrives at a node 710 containing an interface to a bus initiator 730 having a pending request to issue and for which it contains a matching identifier or, if the request token contains an identifier of the regulator 740, when it arrives at a node 710 containing an interface to any bus initiator 730 having a pending request to issue.

When a bus initiator 730 removes a request token from the control bus 700, the bus initiator 730 issues a request onto the control bus 700. The request may be a write request or a read request. A write request is a request to write to a storage associated with a bus target 720. A read request is a request to read from a storage associated with a bus target 720.

Write requests comprise a header and a payload. These are transmitted without gaps onto the control bus 700. The payload contains the data to be written to the associated storage of the bus target/s 720. Write requests can be unicast or broadcast. Unicast write request are issued to an identified single bus target 720 on the control bus 700. Broadcast write requests are issued to all of the bus targets 720 on the control bus 700.

When a bus target 720 receives a unicast write request, it issues a write completion in response to receipt of the write request. The write completion is returned to the bus initiator 730 that issued the write request. The write completion comprises an indication of whether or not the write request was successful or not. For broadcast write requests, no write completion is returned by the bus targets 720.

Read requests each comprise a header without a payload. Read requests are unicast. A bus target 720 that receives a read request, responds by issuing a read completion. The read completion comprises a header and a payload, where the payload comprises the data read from the address indicated in the read request. The read completion also comprises an indication of whether or not the read was successful or not. This indication is contained in the header of the read completion packet. If the read completion comprises an indication that the read request was not successful, the bus initiator 730 that receives the read completion will disregard the data contained in the payload.

Figure 2:
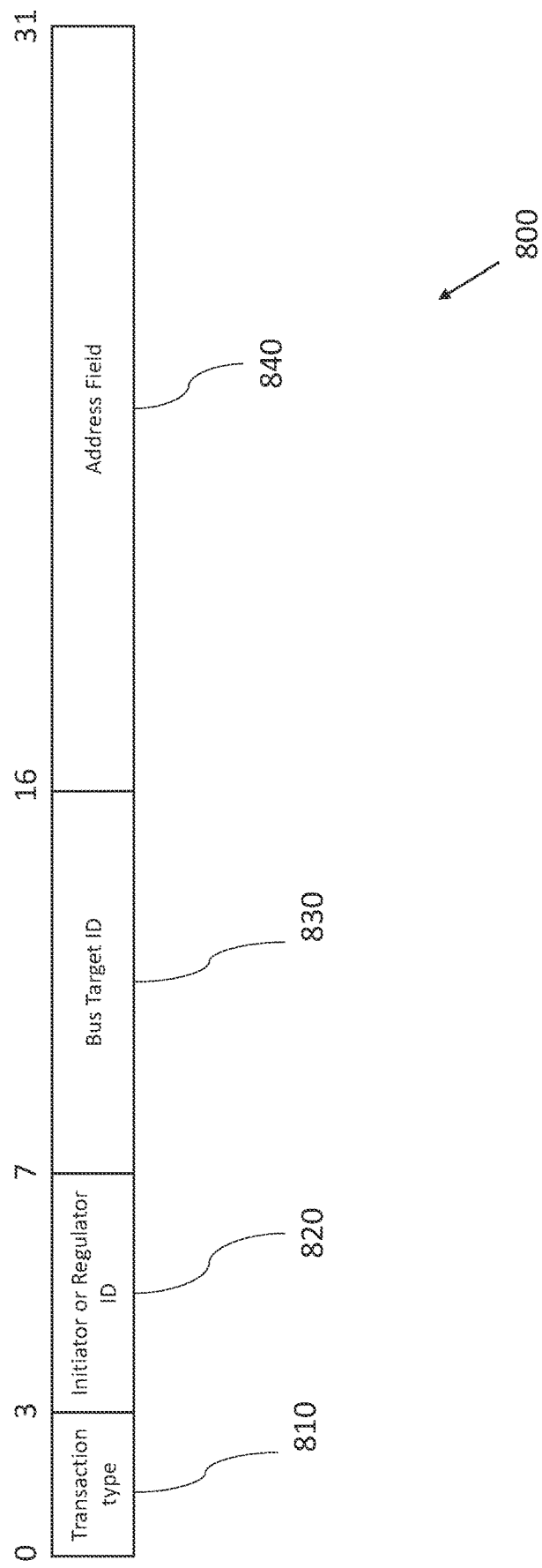
FIG. 2 illustrates the fields of a header of a data packet for sending over the network.

Reference is made to FIG. 2, which illustrates an example of a header 800 of one of the packets issued onto the control bus 700. The header 800 may be a header of a read request, write request, read completion, write completion, request token or completion token. Some these packet types may omit certain fields. For example, the address filed 840 could be omitted from request and completion tokens.

Some of the packets circulating on the bus 700 also include payloads (e.g. the write request or read completion), but these are not shown in FIG. 2. The numbering along the header indicates the bits of the header 800. This example header 800 comprises 32 bits, with the transaction type 810 indicated at 0:3 bits, the identifier 820 of the bus initiator 730 or regulator 740 at bits 4:7, the bus target identifier 830 at bits 8:16, and the address offset 840 at bits 17:31. These numbers are examples only and the number of bits in the header 800 and the assignment of the bits for different fields may differ in other examples.

The header 800 includes an indication 810 of the transaction type. This indication 810 identifies whether the packet is a read request, write request, read completion, write completion, request token or completion token.

The header 800 includes an identifier 820 of either a bus initiator 730 or a regulator 740. This is the initid field, discussed above. In a request packet, the identifier 820 indicates which of the bus initiators 730 provided the request packet onto the control bus 700. In a completion packet, the identifier 820 indicates the destination bus initiator 730 for the completion. For request token packets, the identifier 820 is an identifier either of the regulator 740 or of one of the bus initiators 730. If the identifier 820 identifies the regulator 740, then the request token can be removed/consumed by any bus initiator 730. If the identifier 820 identifies one of the bus initiators 730, then the request token can only be removed/consumed by the bus initiator 730 that is identified by the identifier 820. On the other hand, a completion token can be removed/consumed by any bus target 720. In some embodiments, the identifier 820 may be absent from completion token packets. In other embodiments, the identifier 820 in completion token packets may identify the regulator 740.

The header 800 includes a bus target identifier field 830, which identifies one of the bus targets 720. For a unicast request packet, the identified bus target 720 is the destination of the request. The identified bus target 720 will respond to the request. In the case of a broadcast request packet, the field 830 comprises an indication that the packet is a broadcast packet.

In some cases, a bus target 720 is associated with multiple bus target identifiers, with different bus target identifiers being associated with different storages associated with the bus targets. For example, a first bus target identifier may be associated with a management register of the bus target 720, whilst a second bus target identifier may be associated with a further storage associated with the same bus target 720. In this case, the field 830 may identify one of the storages associated with a particular bus target 720.

For a completion packet, the field 830 identifies the bus target 720 from which the completion packet originated. This information may be used for debug purposes. When multiple bus targets 720 aggregate their state into a single completion packet (which is performed when the completion is issued in response to a broadcast request), the field 830 does not identify a bus target 720. In this case, the field 830 is left undefined.

The header 800 comprises an address field 840, which indicates an address in a bus target's associated storage. This address may be an address in an auto-generated register associated with a bus target 720. The address may be the address in an address window associated with the bus target 720. In request packets, this address indicates the address from which the read or write is to be carried out. In completion packets, the address field 840 contains the same address as is present in the address field 840 of the corresponding request packet which the completion packet is issued in response to.

As described, access to the control bus 700 by the bus targets 720 and the bus initiators 730 is controlled by a token system. A bus initiator 730 can only issue a request onto the control bus when it has consumed a request token which arrived at the Node 710 to which it is connected. A Bus target 720 can only issue a completion onto the control bus 700 when it has consumed a completion token which arrived at the Node 710 to which it is connected. The regulator 740 is responsible for issuing tokens and, therefore, controlling the degree to which multiple transactions can circulate on the control bus at the same time.

The lifecycle of a control bus 700 transaction is split into two main phases. These phases are the request and the completion phases.

During a request phase, when a bus initiator 730 has a request pending, it waits for a request token to arrive at its connected node 710. When a request token is received at the connected node 710, if the identifier 820 of the request identifies either the bus initiator 730 itself or the regulator 740, then in response to determining as such, the bus initiator 730 consumes the request token and replaces the token with the pending request. Some of the nodes 710 of the control bus 700 contain an interface to an attached bus initiators 730. The interface at each of such nodes 710 examines the initiator identifier 820 in a request token and provides the request token to the bus initiator 730 upon the appropriate identifier being determined to be present. The interface that makes the determination could be part of processing logic of the bus initiator 730 itself or could be separate circuitry of the node 710.

Some of the nodes 710 of the control bus 700 contain an interface to the attached bus targets 720. The interface at each of such node 710 examines the target identifier 820 in a request packet and provides the request packet to the bus target 720 it is contains an identifier matching the identifier of the attached bus target 720. The interface that makes the determination could be part of processing logic of the bus target 720 itself or could be separate circuitry of the node 740.

Each of the bus targets 720 contains a buffer in which read or write requests are received from bus initiators 730 on the control bus 700. The buffer in each bus target 720 is sufficiently large to be able to store a request from every bus initiator 730 on the control bus 700. For example, if the control bus 700 supports 16 initiators, the buffer in each bus target 720 is able to store at least 16 requests. The processing logic of the bus target 720 will process requests stored in the buffer in turn and cause corresponding completions to be issued onto the control bus 700. By providing buffering space for a request from all bus initiators 720 on the control bus 700, each request will be removed once it reaches the corresponding bus target 720.

Some of the bus targets 720 are configured as slow bus targets. A slow bus target, upon receiving a request which is directed to it, consumes that request, acts upon it, and replaces the request with a request token on the control bus 700.

Some of the bus targets 720 are configured as fast bus targets. A fast bus target is a bus target 720 which, upon receiving a request, acts upon the request (i.e. by reading or writing to its identified storage address), but leaves the request circulating on the control bus. In other words, the bus target 720 that processes the request does not consume it. Instead, the request is consumed by the bus initiator 730 that issued it. This bus initiator 730 replaces the request with a request token that then circulates on the control bus 700. The configuration of bus targets 720 as fast bus targets has at least two advantages. Firstly, this mode of operation works well for broadcast requests, since the request that is to be processed by a plurality of bus targets 720 will not then be consumed by the first of such bus targets 720. Instead, the request will propagate to all of the plurality of bus targets 720 without being consumed by the first bus target 720 it encounters. Secondly, the regeneration of the request token by the bus initiator 730 means that the next bus initiator 730 along the ring 700 has the highest priority access to the control bus 700, resulting in a fairer bus access scheme.

Following the request phase, the completion phase is carried out. During the completion phase, following receipt and processing of a request, a bus target 720 issues a completion packet onto the control bus 700, which is consumed by the bus initiator 730 from which the corresponding request originated. A bus target 720 with a pending completion, will issue its completion if a completion token arrives at the node 710 to which it is connected.

When a bus target 720 receives a read or write request from the control bus 700, whether or not the read or write request is serviced depends upon whether or not the stored access permissions indicate that the bus initiator 730 from which the request originated has access for that bus target. In other words, access permissions are defined on a bus initiator-bus target basis. These access permissions are part of management state held in a management register of the bus target 720.

Each of the bus targets 720 and bus initiators 730 comprise processing logic and storage for carrying out the operations as described. The processing logic may comprise processing logic configured to execute computer readable instructions stored in the memory of the target 720 or initiator 730 to perform the operations. The processing logic may alternatively or additionally comprise a field programmable gate array or an application specific circuit.

Figure 3:
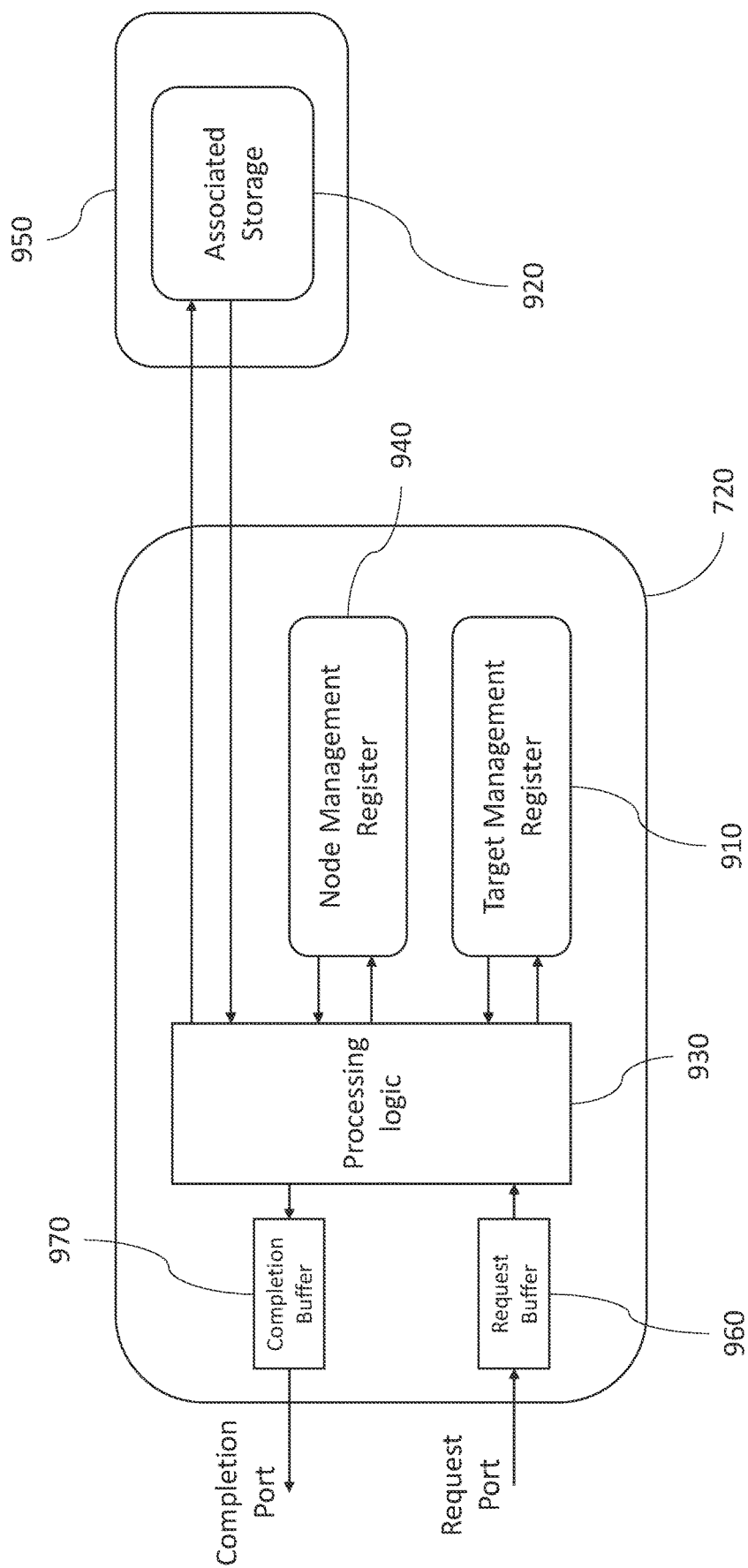
FIG. 3 illustrates an example of a target.

Reference is made to FIG. 3, which illustrates an example bus target 720. The bus target 720 comprises bus target management register 910, which may be written to in response to received write requests from the control bus 700. Such requests to write to the bus target's management register 910 may be referred to as management requests. The bus target management register 910 stores the access permissions for each bus initiator 730. These access permissions may be written to the management register 910 by selected units referred to as the first and second management units (which may also be referred to as the level 1 manager and the level 2 manager), which will be discussed in more detail later. Each management unit comprises a bus initiator 730 for issuing write requests to target management state to define access permissions.

In addition, each bus target 720 comprises at least one node management register 940. The node management register 940 can be written via a dedicated node management broadcast write request, which writes a common set of state to all of the node management registers 940 in the bus targets 720. This broadcast write is performed by a further management unit, referred to as the level 0 manager herein, which will be discussed in more detail later.

In addition to the at least one bus target management register 910, the bus target 720 is associated with additional storage 920 that is part of the receiving block 950 of the component to which the bus target 720 belongs. The additional storage 920 may comprise an auto-generated register and/or storage accessible via an addressable window. This additional storage 920 may include control registers on tiles 4 of the chip 2 that are addressable over a further bus. This additional storage 920 may allow access to off-chip storage, such as host storage that is accessible over PCI links. In this, case, the additional storage 920 is memory of a host dispatcher that provides data written to the memory to the host storage.

The bus target 720 connects to the control bus 710 via an interface comprising a request port and a completion port. The request port receives read and write requests from the control bus 700, with these requests being buffered in request buffer 960 and then passed to the processing logic 930. The completion port sends completions from the completion buffer 970 onto the control bus 700. The processing logic 930 may perform functions implemented in hardware or software. The processing logic 930 may comprises one or more of an ASIC, FPGA, or at least one processor configured to execute computer readable instructions stored in at least one memory of the bus target 720.

The processing logic 930 determines whether the request is to be serviced by examining the bus initiator identifier present in a read/write request received at the bus target 720 and looking up in the registers 910, the stored access permissions associated with the bus initiator 730 that is identified by the read/write request. If the access permissions indicate that the bus initiator 730 identified in the read/write request has, according to the stored access permissions, access to the storage 920 associated with the bus target 720, then the bus target 720 will determine to service the request by allowing the read/write to be carried out. Following this, the processing logic 930, will cause a completion packet to be sent onto the control bus 700. If the access permissions indicate that the bus initiator 730 identified in the read/write request does not have permission to access storage 920 associated with the bus target 720, then the bus target 720 will not service the request. The bus target 720, in this case, will return a completion packet that indicates to the bus initiator 730 that sent the request that the request was not successfully carried out. This completion packet is sent by the processing logic 930 over the completion port. The completion packets are buffered in the completion buffer 970 before being sent over the completion port.

The bus target management register 910 stores management state information. All bus targets 720 contain such a register 910, which resides in management space. The type of information contained in the bus target management state is the same in each of the bus targets 720. However, the bus target management state may be programmed with different settings on a per bus target basis. The bus target management state includes the access permissions that are defined in each bus target 720 for each bus initiator 730. The bus target management state may include indications of certain addresses of storage accessible via the bus target 720 that are whitelisted, i.e. the access permissions do not apply for these addresses and they can be read to and written from by any of the bus initiators 730.

Further management state (referred to as node management state) is stored in the register 940 of the bus target 720. Node management state is programmed with the same settings for all bus targets 720. This may be achieved by one or more of the bus initiators 730 issuing one or more broadcast write requests to the bus targets 720. Node management state includes identification of the level 1 manager. Node management state includes identification of the level 2 manager. The node management state includes fuse state settings, including the identification of the level 1 manager, that are distributed from a system fusebox.

Each bus initiator 730 has a unique initiator ID assigned in hardware that is not programmable. The node management register 940 in every bus target 720 defines the initiator ID of the bus initiator 730 of the Level 2 manager. This may be set programmably, but only by write requests issued by the Level 1 manager. Since the ID of the bus initiator 730 of the level 2 manager must be the same in each register 940 of every target 720, the level 1 manager writes this ID using a broadcast write to all the bus targets 720 on the bus 700.

Each bus target 720 is also associated with storage 920. Unlike the bus target management register 910, the associated storage 920 may take different forms and varies from bus target 720 to bus target 720. Therefore, unlike the bus target management register 910, which is the same for each bus target (even if the state held in the register 910 differs between bus targets 720), the associated storage 920 components are different for each bus target 720.

When a bus target 720 receives a read/write request, it distinguishes between a read/write request directed to the register 910 and one directed to the storage 920 based on the bus target identifier 830 contained in the request. Each bus target 720 is associated with two different identifiers. A first of these identifiers is an identifier associated with the register 910, whilst a second of these identifiers is an identifier associated with the associated storage 920. The processing logic 930 examines the bus target identifier 830 and selects one of the register 910 and storage 920 for which the read/write request is to be processed in dependence upon this bus target identifier 830.

The access permissions stored in register 910 are used by the processing logic 930 to determine how to process a received request to read or write to/from storage 920. The processing logic 930 receives a read or write request and examines the bus initiator identifier contain in the request. The processing logic 930 uses the bus initiator identifier to look up in the bus target management register 910, the access permissions for that bus initiator 730. If the processing logic 930 determines, based on its associated permission settings, that the bus initiator 730 has access to the associated storage 920, then the processing logic 930 causes the request to be fulfilled. In this case, the read/write to storage 920 is carried out. On the other hand, if the processing logic 930 determines, based on its associated permission settings, that the bus initiator 730 does not have access to the associated storage 920, then the processing logic 930 prevents the write or read request from being serviced.

In embodiments, the set of access permission settings stored in register 910 comprise two subsets of access permissions. Between them, the subsets of access permissions are defined by a first component (referred to herein as the level 1 management unit), and a second component (referred to herein as the level 2 management unit). Either of the level 1 management unit or the level 2 management unit can write to either of the subsets of access permissions. However, the level 2 management unit cannot update an access permission setting that has been set by the level 1 manager so as to prevent access.

Each subset of access permission settings comprises a setting associated with each bus initiator 730. For a given bus initiator 730, if either of the access permission settings for that bus initiator 730 comprises an indication that access is not permitted, then read or write requests received from the bus initiator 730 are not serviced (with exceptions to this rule applied for the level 1 and level 2 management unit). However, read or write requests to storage 920 from the level 1 management unit are always serviced. Read or write request to storage 920 from the level 2 management unit are serviced unless the level 1 permission setting indicates that access is not permitted for the level 2 manager. Hence, the level 1 settings have priority over the level 2 settings, since they can also prevent access by the level 2 manager.

Reference is made to FIG. 4, which illustrates the different possibilities for the setting of the access permissions. As shown in the table 1100, each bus initiator 730 is associated with two different settings, one for each level of access permissions. For bus initiator 1, both the level 1 and level 2 access permissions indicate (by 0*b*) that access is permitted for the particular bus target 720 which stores the settings 1100. Therefore, a request issued by bus initiator 1 and received at the bus target 720 will be serviced by the bus target 720, i.e. the read or write will be carried out.

For bus initiator 2, the level 1 access permission setting indicates (by 0*b*) that access is permitted for the particular bus target 720 that stores the settings 1100, However, the level 2 access permission setting indicates (by 1*b*) that access is not permitted for the particular bus target 720. Therefore, a request issued by bus initiator 2 (assuming that bus initiator 2 does not belong to the level 1 manager or level 2 manager) and received at the bus target 720 will not be serviced by the bus target 720, i.e. the read or write will not be carried out.

Similarly, for bus initiator 3, the level 2 access permission setting indicates (by 0*b*) that access is permitted for the particular bus target 720 that stores the settings 1100. However, the level 1 access permission setting indicates (by 1*b*) that access is not permitted for the particular bus target 720. Therefore, a request issued by bus initiator 3 (assuming that bus initiator 3 is not part of the level 1 manager) and received at the bus target 720 will not be serviced by the bus target 720, i.e. the read or write will not be carried out.

For bus initiator 4, since both level 1 and level 2 access permission settings indicate that access is not permitted, a request from bus initiator 4 (assuming bus initiator 4 does not belong to the level 1 manager) will not be serviced by the bus target 720, i.e. the read or write will not be carried out.

Therefore, two layers of security are enabled, which allows a level 2 management unit to add its own security requirements on top of the level 1 security requirements that apply to the level 2 management unit itself. This means that, for requests made by any bus initiator 730 (other than those of the Level 1 and level 2 Managers), access can be blocked by settings distributed from either of the management units.

It will now be described, how the level 1 and level 2 management unit configure the permission settings. Reference is again made to FIGS. 1 and 3. As noted, the bus target management register 910 stores management state, including the access permission settings, for the relevant bus target 720. This management state can be written to by the management units issuing write requests with the bus target identifier associated with the bus target management register 910 of the relevant bus target 720 onto the control bus 700. The other bus initiators 730, apart from those of the management units cannot write to the management state.

One of the bus initiators 730 belongs to a third management unit (referred to as a level 0 manager). The level 0 manager contains certain state that is set during manufacture and can't be changed. The level 0 manager is a system fusebox. The level 0 manager is configured to issue write requests onto the control bus 700 to distribute its state to the nodes 710 and bus targets 720 in the system. The write request include, as a bus initiator identifier 820, the identifier of the level 0 manager. Each bus target 720 will update its state in node management register 940 in response to determining that the bus initiator identifier 820 in a received write request to its bus target management register 910 matches that of the level 0 manager.

The state that is distributed by the level 0 manager includes an identifier of the level 1 manager, which is stored in the bus target management register 910 of each bus target 720. The level 1 manager can then issue write requests to update certain state in the bus target management register 910, since it will be recognised as the level 1 manager by the bus targets 720. The level 1 manager can issue (via its requesting circuitry) write requests to write to the bus target management registers 910 of each of the targets 720, an identifier of the level 2 manager. The write of the identity of the level 2 manager to the targets 720 is performed before further bus activity is allowed to take place. Once the identity of the level 2 manger is distributed to the targets 720, the level 2 manager can then issue (via its requesting circuitry) write requests to update certain state in the bus target management register 910, since it will be recognised as the level 2 manager by the bus targets 720.

The level 1 manager can update the level 1 permission settings or level 2 permission settings held in the bus target management register 910. The level 2 manager can also update the level 1 permission settings or level 2 permission settings held in the bus target management register 910. When an incoming write request to update the level 1 permission settings or level 2 permission settings held in register 910 is received at the bus target 720, the processing logic 930 identifies the bus initiator identifier 820 contained in the write request. If the bus initiator identifier 820 matches the identifier of the level 1 manager stored in the register 910, then the processing logic 930 causes the level 1 permission settings or level 2 permission settings in the register 910 to be updated in accordance with the write request.

The level 2 manager can also update the level 1 and level 2 permission settings held in register 910, providing those permission settings have not been written by the level 1 manager to prevent access. In other words, the level 2 manager can add security layers, but cannot remove security layers added by the level 1 manager.

Where the level 1 manager has removed an access permission (i.e. changed a permission setting to indicate that access for a given bus initiator 730 is not permitted), the level 2 manager may not subsequently re-enable that access. In other words, the level 2 manager cannot alter an access permission setting that has been set by the level 1 manager to indicate that access is not allowed. This may be implemented by, when an incoming write request to update the level 1 permission settings or level 2 permission settings held in register 910 is received at the bus target 720, the processing logic 930 identifies the bus initiator 730 that sent the request from the identifier 820 contained in the write request, and checks a stored indication in register 910 to determine whether the level 1 manager has written to the targeted access permission setting so as to prevent access. If the bus initiator identifier 820 matches the identifier of the bus initiator 730 of the level 2 manager stored in the register 910, and the level 1 manager has not set the permission setting to prevent access, then the processing logic 930 causes the permission setting in the register 910 to be updated in accordance with the write request. If the bus initiator identifier 820 does not match the either the identifier of the level 2 manager or the level 1 manager stored in the register 910, then the processing logic 930 does not update the permission setting in accordance with the request, and returns a completion to the bus initiator 730 that sent the request indicating that the request failed. If the bus initiator identifier 820 does match the identifier of the level 2 manager stored in the register 910, but the stored indication indicates that the level 1 manager has set the permission setting to prevent access, then the processing logic 930 does not update the permission setting in accordance with the request, and returns a completion to the bus initiator 730 that sent the request indicating that the request failed.

When the system boots, the level 1 manager first issues writes to the target management register 910 to define the level 1 access permission settings. Subsequently, the level 2 manager issues writes to the target management register 910 to define the level 2 access permissions. Therefore, the level 1 manager first defines a first layer of access permissions. The level 2 manager then adds its own layer access permissions. If either of the layers of access permissions prevent access by a bus initiator 730, then the processing logic 930 prevents that bus initiator 730 from having read or write access to storage 920.

The setting of access permissions is useful for preventing certain software entities of the system 1000 from having read or write access to the storage 920 associated with bus targets of the chip 2. This software may be untrusted third party software for which it is useful to restrict access.

An example application of the dual level management system will now be given.

In the example, an on chip processor is the level 1 manager and the hypervisor running on the host 93 is the level 2 manager. The trusted system hypervisor is provided with access to the storage 920 associated with each bus target 720 and the bus target management register 910 of each bus target 720. In other words, the level 1 access permissions are not set to prevent access for the level 2 manager. However, as Level 2 manager, the hypervisor has the freedom to add level 2 access permissions so as to restrict the access of a user virtual machine running on the host. This prevents a rogue or malignant user process from compromising system availability for other users and from leaking data belonging to other users. The on chip processor remains free to set level 1 access permissions for required cases, such as an operator's policies. The operator may, for example, decide to exclude the on chip processor from access by certain bus initiators 730 (e.g. those outside of system services, for example).

It has been described that the dual level of control exercised by the first management unit and the second management unit is implemented by having two sets of access permissions. However, embodiments are not limited to using a two sets of access permissions, but could use only a single set of access permissions. Reference is made to FIG. 5, which illustrates a set of access permission settings 1300 where this is the case. A flag is stored as part of the access permission settings to indicate whether access has been prevented by the first management unit.

In FIG. 5, a first access permission setting (for initiator 1) and a third access permission setting (for initiator 3) both illustrate cases where the first management unit has not modified an access permission setting. Since the first management unit has not modified the relevant access permission setting to indicate that access is not permitted, the flag indicates that the access permissions can be modified by the second management unit. In this case, the setting can be modified by the second management unit. A second access permission setting (for initiator 2) illustrates a case where the first management unit has modified the access permission setting to indicate that access is permitted. Since the first management unit has not modified the relevant access permission setting to indicate that access is not permitted, the flag indicates that the access permission can be modified by the second management unit. In this case, the second management unit can modify the access permission setting. A fourth access permission setting (for initiator 4) illustrates a case where the first management unit has modified the access permission setting to indicate that access is not permitted. Since the first management unit has modified the relevant access permission setting to indicate that access is not permitted, the flag indicates that the access permission cannot be modified by the second management unit. In this case, the second management unit cannot modify the access permission setting.

In the table shown in FIG. 5, the fifth column shows whether or not access is permitted for the respective initiator 730 to which the setting applies.

Reference is made to FIG. 6, which illustrates a further example of a set of permission settings 1200 that could be stored in a bus target 720. The set of permission settings 1200 includes a level 1 permission setting and a level 2 permission setting for each of a set of bus initiators 730, and a flag associated with each setting to indicate whether that setting has been set by the first management unit.

In FIG. 6, for the level 1 access permission settings associated with initiators 1 and 3, the level 1 management unit has not written to these settings to prevent access. Therefore, the second management unit can change any of these settings. For the level 1 access permission setting associated with initiator 4, the first management unit has written to this setting to prevent access. Therefore, the second management unit cannot change this setting. For the level 2 access permission settings associated with initiators 1, 3 and 4, the first management unit has not written to these settings to prevent access. Therefore, the second management unit can change any of these settings. For the level 2 access permission setting associated with initiator 2, the first management unit has written to this setting to prevent access. Therefore, the second management unit cannot change this setting.

As noted above, certain whitelisted addresses can be defined in the target management register 910. The setting of the whitelisted address is subject to the similar rules as discussed above for the access permission settings. The first management unit and the second management unit may both define sets of whitelisted addresses. However, the second management unit may not whitelisted an address in a storage to which access has been prevented by the first management unit. The processing logic 930 prevents a write request to write a whitelisted address from being serviced in response to a determination that access to the storage 920 containing this address has been prevented by the first management unit.

Figure 7:
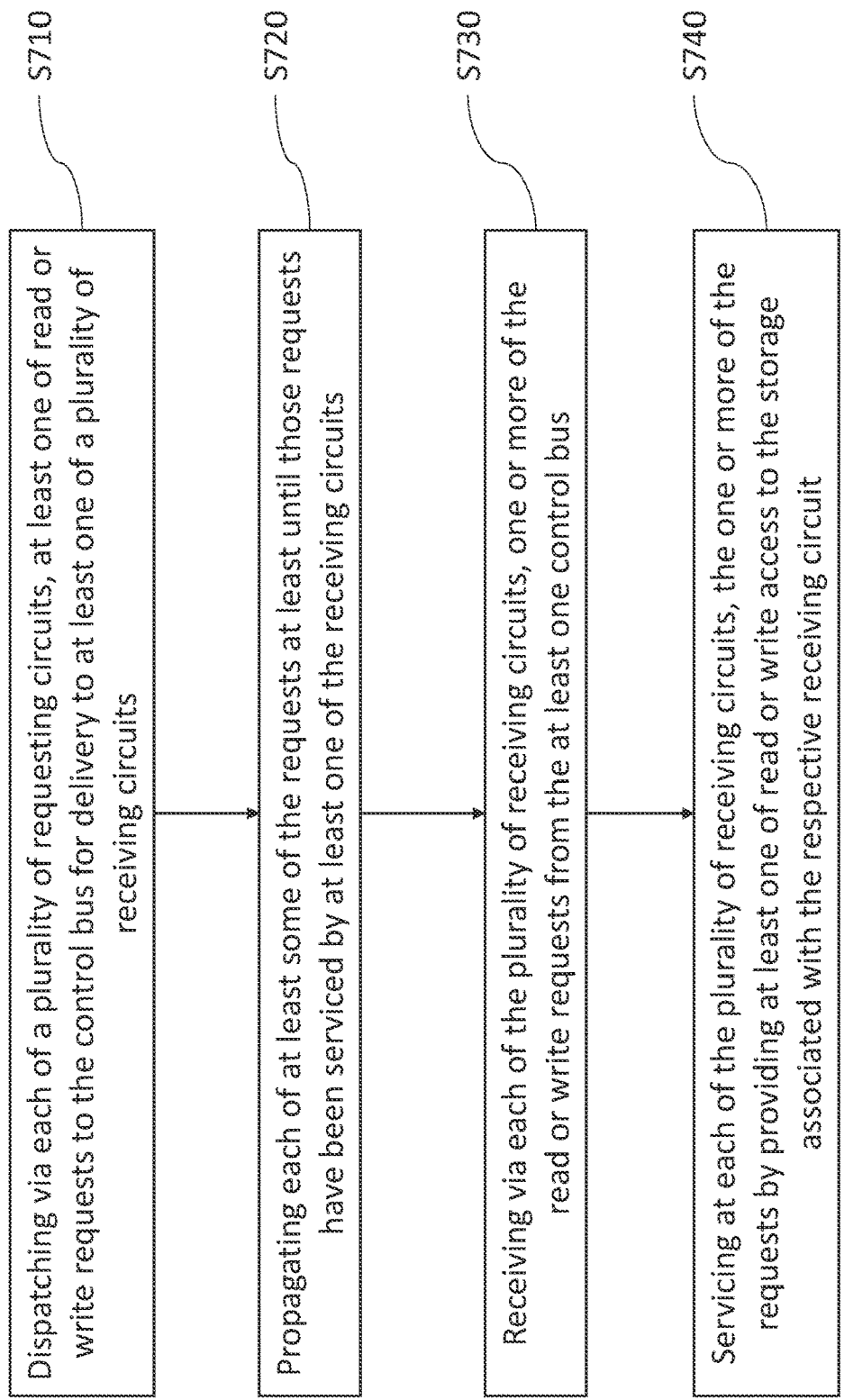
FIG. 7 illustrates an example method implemented using a control bus.

Reference is made to FIG. 7, which illustrates a method 700 according to embodiments of the application. It would be appreciated that although the steps of the method 700 are shown sequentially, the time periods during which the steps are carried out may overlap.

At S710, each of the plurality of requesting circuits dispatches onto the control bus, at least one of read or write requests for delivery to at least one of a plurality of receiving circuits.

At S720, the control bus propagates each of at least some of the requests at least until those requests have been serviced by at least one of the receiving circuits.

At S730, each of the plurality of receiving circuits receives one or more of the read or write requests dispatched by the requesting circuits.

At S740, each of the receiving circuits services the respective one or more of the requests by providing at least one of read or write access to the storage associated with the respective receiving circuit.

Figure 8:
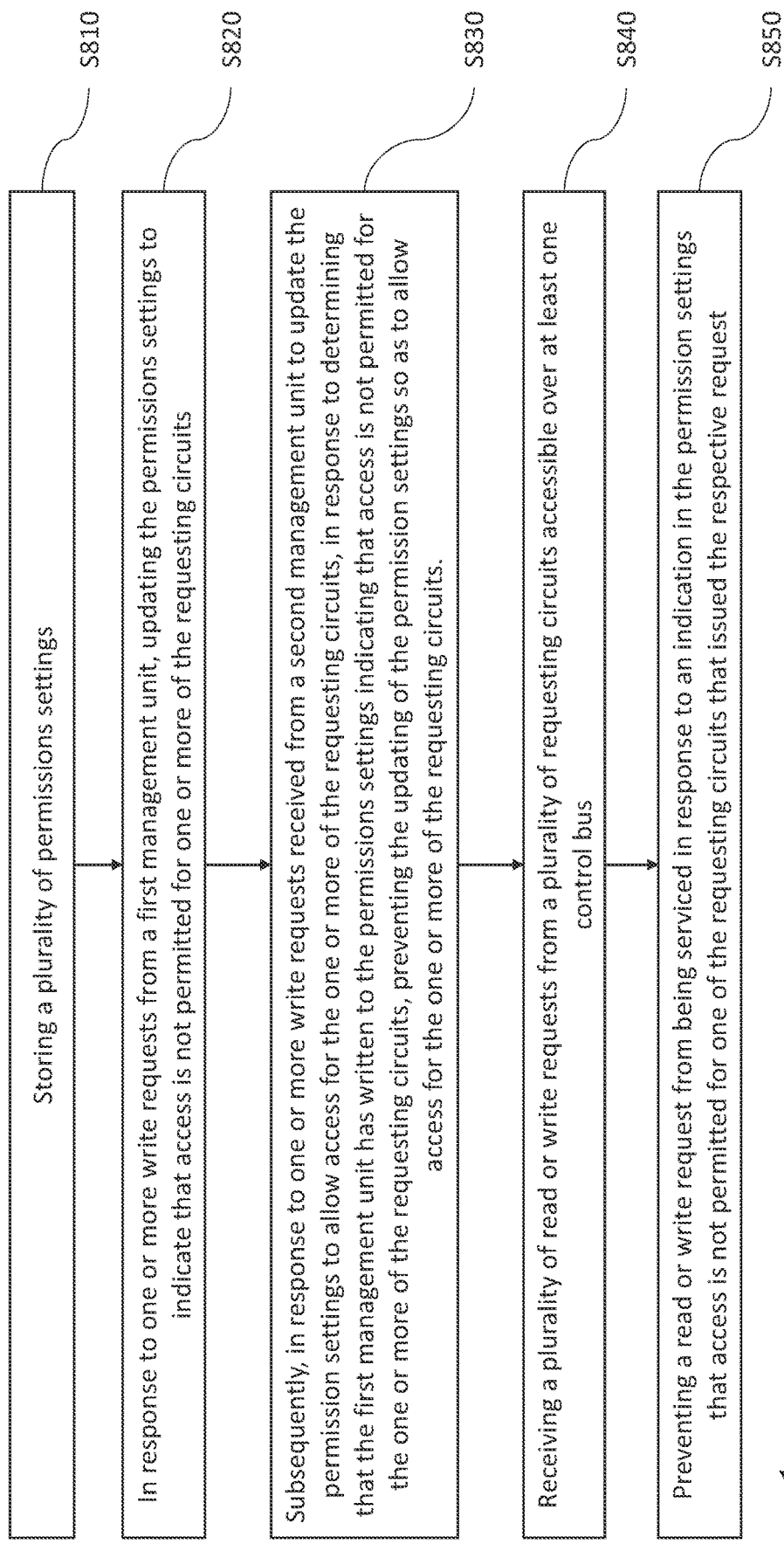
FIG. 8 illustrates an example method implemented in a receiving circuit.

Reference is made to FIG. 8, which illustrates a method 800 according to embodiments of the application. It would be appreciated that the order of these steps may be altered from the order shown in FIG. 8 according to embodiments.

At S810, a plurality of permission settings are stored in at least one register of the receiving circuit.

At S820, an interface of the receiving circuit receives one or more write requests from a first management unit, and in response to these one or more write requests, updates the permission settings to indicate that access is not permitted for one or more of the requesting circuits.

At S830, an interface of the receiving circuit receives one or more write requests from a second management unit, the write requests being requests to allow access for the one or more of the requesting circuits, in response to determining the first management unit has written to the permissions settings indicating that access is not permitted for those one or more of the requesting circuits (as performed in S820), the updating of the permission settings so as to allow access for the one or more of the requesting circuits is prevented.

At S840, an interface of the receiving circuit receives a plurality of read or write requests from a plurality of requesting circuits accessible over at least one control bus. Each of the read or write requests is request to access at least one storage associated with the receiving circuit.

At S850, in response to an indication in the permission settings that access is not permitted for at least one of the requesting circuits that issued the respective request, read or write requests are prevented from being serviced.

It will be appreciated that the above embodiments have been described by way of example only.

The invention claimed is:

1. A device comprising:
a control bus;
a plurality of circuits, each of which is accessible on the control bus, the plurality of circuits including a plurality of requesting circuits and a plurality of receiving circuits, each of the receiving circuits being associated with a storage,
wherein each of the plurality of requesting circuits is operable to dispatch requests to the control bus for delivery to at least one of the plurality of receiving circuits, each of the requests being a request to read or write from a storage associated with one or more of the receiving circuits to which it is dispatched,
wherein each of the receiving circuits is operable to receive one or more of the requests from the control bus and service the one or more of the requests by providing at least one of read or write access to the storage associated with a respective receiving circuit,
wherein the control bus provides a ring path configured to support the requests in circulation in the ring path, wherein the control bus is configured to propagate each of the requests at least until those requests have been serviced by one of the receiving circuits,
wherein the control bus is configured to transport one or more request token packets, wherein a first of the requesting circuits is configured to:
dispatch a first of the requests in response to receipt of a first of the request token packets; and
consume the first of the request token packets that triggered the dispatching,
wherein a first of the receiving circuits is configured to service the first of the requests, including leaving the first of the requests to circulate on the control bus,
wherein the first of the requesting circuits is configured to, in response to receipt of the first of the requests, replace the first of the requests with one of the request token packets for circulation on the control bus.

2. The device of claim 1, wherein each of at least some of the requests comprises an identifier of a first one of the receiving circuits, wherein the first one of the receiving circuits is configured to service one or more of the at least some of the requests in response to an interface associated with the receiving circuit determining that the respective one or more of the at least some of the requests comprises an identifier of the respective receiving circuit.

3. The device of claim 1, wherein the servicing the one or more requests comprises each of at least some of the receiving circuits dispatching one or more completion packets onto the control bus for delivery to one or more requesting circuits that sent the respective one or more requests.

4. The device of claim 3, wherein the control bus is configured to transport one or more completion token packets, wherein each of the plurality of receiving circuits is operable to:
  perform the dispatching of each of the one or more completion packets in response to receipt of one of the completion token packets; and
  for each of the one or more completion packets, consume a respective one of the one or more completion token packets that triggered the dispatching.

5. The device of claim 4, comprising a regulator circuit configured to control a number of completion token packets circulating on the control bus by issuing completion token packets onto the control bus.

6. The device of claim 3, wherein at least one of the requests is a read request, wherein servicing the read request comprises dispatching a read completion packet onto the control bus for delivery to the at least one requesting circuit that sent the read request, wherein the read completion packet comprises a payload comprising data read from a storage associated with at least one of the receiving circuits that serviced a corresponding read request.

7. The device of claim 1, wherein the one of the circuits is one of the requesting circuits.

8. The device of claim 1, comprising a regulator circuit configured to control a number of the request token packets circulating on the control bus by issuing ones of the request token packets onto the control bus.

9. The device of claim 1, wherein a first one of the requests is a broadcast request for delivery to all of the receiving circuits on the control bus, wherein each of the plurality of receiving circuits is configured to receive and service the broadcast request.

10. The device of claim 1, wherein each of the storages associated with one of the plurality of receiving circuits is part of a component of the device that comprises the associated one of the plurality of receiving circuits.

11. The device of claim 10, wherein each of the components comprises one or more of:
  a management central processing unit;
  a plurality of processors; and
  a dispatcher for access to a host processing system.

12. The device of claim 1, wherein each of at least some of the plurality of receiving circuits comprises at least one register storing at least one access permission, wherein, for each of these at least some of the plurality of receiving circuits storing at least one access permission, the servicing the one or more of the requests is performed in response to determining from the respective at least one access permission that access to the associated storage of the respective receiving circuit is permitted.

13. The device of claim 12, wherein each of the least one access permissions comprises a set of access permissions comprising a setting associated with each of at least some of the requesting circuits,
  wherein for each of these at least some of the plurality of receiving circuits storing a set of access permissions, the servicing the one or more of the requests is performed in response to determining from the respective set of access permissions that access to the associated storage of the respective receiving circuit is permitted for the requesting circuit that dispatched the respective request.

14. The device of claim 1, wherein the device is an integrated circuit.

15. A method implemented in a device having a control bus, wherein the control bus provides a ring path for carrying control traffic among a plurality of bus targets and a plurality of bus initiators, the method comprising:
  transporting on the control bus, one or more request token packets;
  dispatching a request via a first bus initiator of the plurality of bus initiators to the control bus for delivery to a first bus target of the plurality of bus targets, the dispatching being performed in response to receipt of a first of the request token packets, the request including a request to access storage associated with the first bus target;
  consuming the first of the request token packets that triggered the dispatching,
  propagating the request at least until the request has been serviced by the first bus target;
  receiving by the first bus target, the request from the control bus;
  servicing at the first bus target, the request, including providing access to the storage associated with the first bus target and leaving the request to circulate on the control bus; and
  in response to receipt of the request at the first bus initiator, replacing the request with one of the request token packets for circulation on the control bus.

16. The method of claim 15, wherein the first bus initiator includes an item selected from a list consisting of:
  an on-chip processor running software or firmware;
  an input output (I/O) port;
  a PCI express endpoint configured to receive the request from software running on an external processor; and
  a hardware unit configured to use the control bus to communicate with another hardware unit on a same chip.

17. The method of claim 15, wherein the first bus target includes an item selected from a list consisting of:
  a hardware unit having control registers storing parameters controlling the hardware unit;
  static random access memory (SRAM) on-chip storage;
  non-volatile on chip storage;
  a bridge to off-chip storage;
  a bridge to an off-ship dynamic random access memory (DRAM) memory controller; and
  circuitry configured to convert packets from a first control bus communication protocol a second control bus communication protocol.

18. The method of claim 15, wherein providing access to the storage comprises providing read access.

19. The method of claim 15, wherein providing access to the storage comprises providing write access.

20. The method of claim 15, wherein the plurality of bus targets and the plurality of bus initiators are implemented on a same chip as the control bus.

21. The method of claim 15, wherein the request comprises an identifier of the first bus initiator.

22. The method of claim 15, wherein servicing the request comprises dispatching a completion packet onto the control bus for delivery to the first bus initiator.

23. The method of claim 15, wherein the request comprises a broadcast request for delivery to each bus target of the plurality of bus targets, wherein each of the bus targets is configured to receive and service the broadcast request.

24. The method of claim 15, wherein the first bus target comprises a register storing an access permission, and wherein servicing the request is performed in response to determining from the access permission that access to the storage is permitted.

25. A device comprising:
a control bus;
a plurality of circuits, each of which is accessible on the control bus, the plurality of circuits including a plurality of bus initiators and a plurality of bus targets, each of the bus targets being associated with a storage,
wherein a first bus initiator of the plurality of bus initiators is operable to dispatch a request to the control bus for delivery to a first bus target of the plurality of bus targets, the request being a request to read or write from a storage associated with the first bus target;
wherein the first bus target is configured to receive the request from the control bus and to service the request, including providing access to the storage;
wherein the control bus includes a ring path configured to support the request and a plurality of additional requests in circulation in the ring path, wherein the control bus is configured to propagate the plurality of additional requests at least until the additional requests have been serviced by at least one of the plurality of bus targets, and
wherein the control bus is configured to transport one or more request token packets, wherein the first bus initiator is configured to:
dispatch the request in response to receipt of a first of the request token packets; and
consume the first of the request token packets that triggered the dispatching,
wherein the first bus target is configured to, in response to receipt of the request at the first bus target, replace the request with one of the request token packets for circulation on the control bus.

26. The device of claim 25, wherein the first bus initiator includes an item selected from a list consisting of:
an on-chip processor running software or firmware;
an input output (I/O) port;
a PCI express endpoint configured to receive the request from software running on an external processor; and
a hardware unit configured to use the control bus to communicate with another hardware unit on a same chip.

27. The device of claim 25, wherein the first bus target includes an item selected from a list consisting of:
a hardware unit having control registers storing parameters controlling operation of the hardware unit;
static random access memory (SRAM) on-chip storage;
non-volatile on chip storage;
a bridge to off-chip storage;
a bridge to an off-ship dynamic random access memory (DRAM) memory controller; and
circuitry configured to convert packets from a first control bus communication protocol a second control bus communication protocol.

28. The device of claim 25, wherein the plurality of bus targets and the plurality of bus initiators are implemented on a same chip as the control bus.

29. A device comprising:
a control bus, wherein the control bus is configured to transport one or more request token packets;
a plurality of requesting circuits each accessible on the control bus;
a plurality of receiving circuits each accessible on the control bus, each of the receiving circuits being associated with a storage; and
a regulator circuit configured to control a number of the request token packets circulating on the control bus by issuing the request token packets onto the control bus,
wherein each of the plurality of requesting circuits is operable to dispatch requests to the control bus for delivery to at least one of the plurality of receiving circuits, each of the requests being a request to read or write from a storage associated with one or more of the receiving circuits to which it is dispatched,
wherein each of the receiving circuits is operable to receive one or more of the requests from the control bus and service the one or more of the requests by providing at least one of read or write access to the storage associated with a respective receiving circuit,
wherein the control bus provides a ring path configured to support the requests in circulation in the ring path, wherein the control bus is configured to propagate each of the requests at least until those requests have been serviced by one of the receiving circuits, wherein each of the plurality of requesting circuits is configured to dispatch the requests in response to receipt of one of the request token packets.

30. A method implemented in a device having a control bus, wherein the control bus provides a ring path for carrying control traffic among a plurality of bus targets and a plurality of bus initiators, the method comprising:
transporting one or more request token packets on the control bus;
controlling by a regulator circuit, a number of the request token packets circulating on the control bus by issuing the request token packets onto the control bus;
in response to receipt of one of the request token packets at a first bus initiator of the plurality of bus initiators, dispatching a request to the control bus for delivery to a first bus target of the plurality of bus targets, the request including a request to access storage associated with the first bus target;
propagating the request at least until the request has been serviced by the first bus target;
receiving by the first bus target, the request from the control bus; and
servicing at the first bus target, the request, including providing access to the storage associated with the first bus target.

31. A device comprising:
a control bus;
a plurality of requesting circuits each accessible on the control bus; and
a plurality of receiving circuits each accessible on the control bus, each of the receiving circuits being associated with a storage;
wherein each of the plurality of requesting circuits is operable to dispatch requests to the control bus for delivery to at least one of the plurality of receiving circuits, each of the requests being a request to read or write from a storage associated with one or more of the receiving circuits to which it is dispatched,
wherein each of the receiving circuits is operable to receive one or more of the requests from the control bus and service the one or more of the requests by providing at least one of read or write access to the storage associated with a respective receiving circuit,
wherein the control bus provides a ring path configured to support the requests in circulation in the ring path, wherein the control bus is configured to propagate each of the requests at least until those requests have been serviced by one of the receiving circuits,
wherein the servicing the one or more requests comprises each of at least some of the receiving circuits dispatching one or more completion packets onto the control bus for delivery to one or more requesting circuits that sent the respective one or more requests, wherein the control bus is configured to transport one or more completion token packets, wherein each of the plurality of receiving circuits is operable to:

perform the dispatching of each of the one or more completion packets in response to receipt of one of the completion token packets; and for each of the one or more completion packets, consuming a respective one of the one or more completion token packets that triggered the dispatching; and wherein the device comprises a regulator circuit configured to control a number of the completion token packets circulating on the control bus by issuing the completion token packets onto the control bus.

32. A method implemented in a device having a control bus, wherein the control bus provides a ring path for carrying control traffic among a plurality of bus targets and a plurality of bus initiators, the method comprising:

dispatching a request via a first bus initiator of the plurality of bus initiators to the control bus for delivery to a first bus target of the plurality of bus targets, the request including a request to access storage associated with the first bus target;

propagating the request at least until the request has been serviced by the first bus target;

receiving by the first bus target, the request from the control bus; and servicing at the first bus target, the request, including providing access to the storage associated with the first bus target, wherein the servicing the request comprises the first bus target dispatching one or more completion packets onto the control bus for delivery to the first bus initiator, wherein the method further comprises:

transporting on the control bus, one or more completion token packets;

performing the dispatching of each of the one or more completion packets in response to receipt of the one or more completion token packets;

for each of the one or more completion packets, consuming a respective one of the one or more completion token packets that triggered the dispatching; and controlling at a regulator circuit, a number of the one or more completion token packets circulating on the control bus by issuing the one or more completion token packets onto the control bus.

* * * * *